F. KUHN, L. H. THOMAS AND J. G. SPIESS.
SOLDERING IRON.
APPLICATION FILED JUNE 11, 1920.
1,394,562.
Patented Oct. 25, 1921.
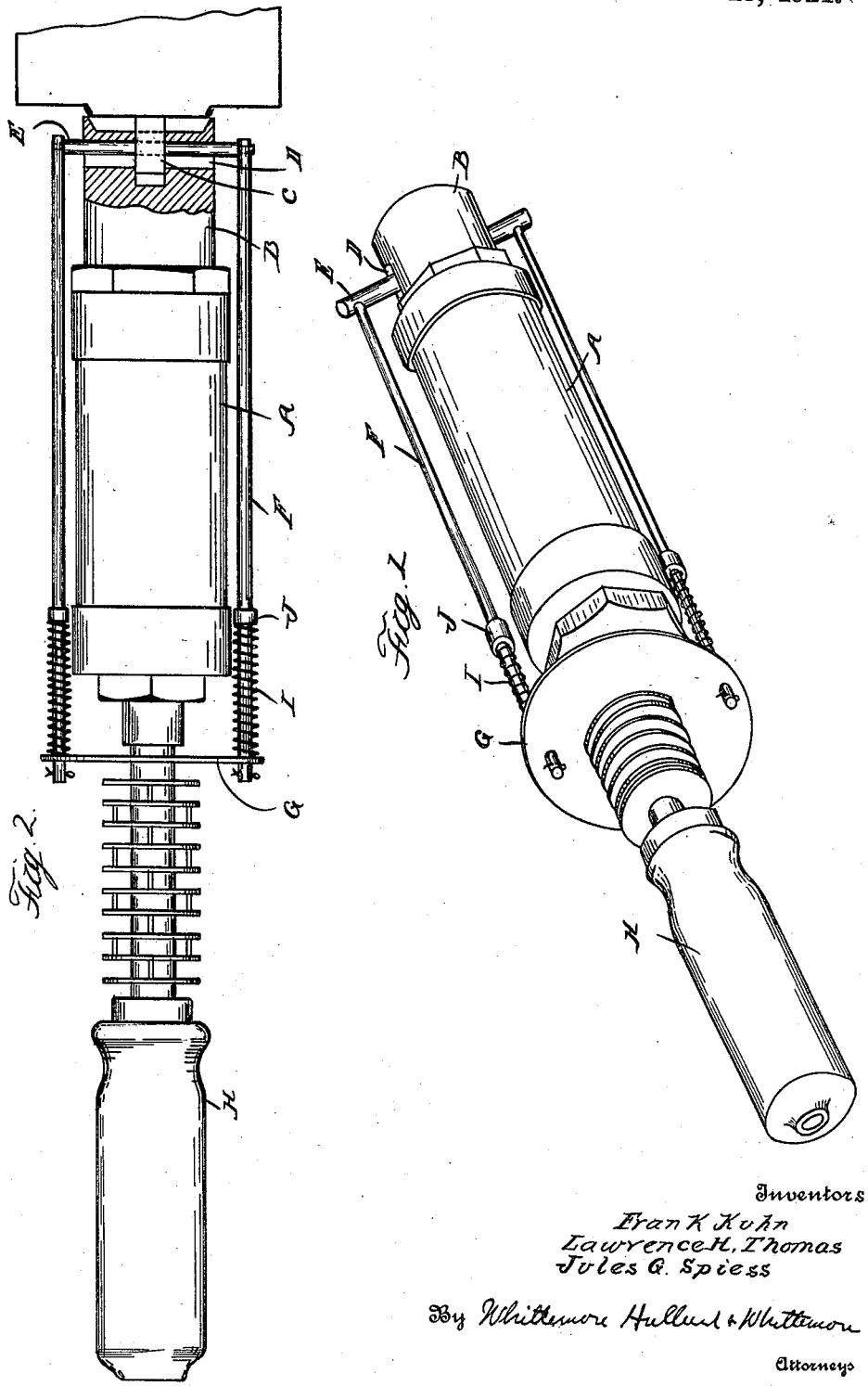
Inventors
Frank Kuhn
Lawrence H. Thomas
Jules G. Spiess
By Whittemore Hulbert & Whittemore
Attorneys

UNITED STATES PATENT OFFICE.

FRANK KUHN, LAWRENCE H. THOMAS, AND JULES G. SPIESS, OF DETROIT, MICHIGAN, ASSIGNORS TO AMERICAN ELECTRICAL HEATER COMPANY, OF DETROIT, MICHIGAN, A CORPORATION OF MICHIGAN.

SOLDERING-IRON.

1,394,562.    Specification of Letters Patent.    Patented Oct. 25, 1921.

Application filed June 11, 1920. Serial No. 388,231.

*To all whom it may concern:*

Be it known that we, FRANK KUHN and LAWRENCE H. THOMAS, both citizens of the United States of America, and JULES G. SPIESS, a citizen of the Republic of France, having taken out first citizenship papers in the United States of America, all residing at Detroit, in the county of Wayne and State of Michigan, have invented certain new and useful Improvements in Soldering-Irons, of which the following is a specification, reference being had therein to the accompanying drawings.

The invention relates to soldering irons and more particularly to constructions designed for soldering can covers and for similar uses. It is the object of the invention to provide means for simultaneously soldering completely around a cover and for holding the parts from displacement until the solder is set. To this end the invention consists in the construction as hereinafter set forth.

In the drawings:

Figure 1 is a perspective view of the tool;

Fig. 2 is a partly sectional elevation thereof.

A is a housing surrounding an electrical heating unit (not shown), by means of which the soldering tool is heated. B is the tool proper, which extends outward from the housing A and is of a cylindrical form having its outer end recessed to form a peripheral edge portion of V-shaped cross section. This annular edge portion corresponds in size to the cover, which is to be soldered in position, and the arrangement is such that when the cover is placed upon the can and engaged by the tool B, the operation of soldering may be simultaneously performed all the way around.

An objection to the construction as thus far described is that when the solder is in molten condition, it has an adhesive effect on a tinned surface, so that the removal of the tool from the work would lift away the cover. To avoid this I have provided means upon the tool for holding the cover pressed against the can, while the soldering edge of the tool is withdraw from contact with the cover. This, as shown, comprises a member C engaging a central recess in the tool B, which recess is intersected by a cross slot D. E is a cross bar extending through the slot D and engaging the member C. F are rods extending longitudinally and on opposite sides of the housing A and at their opposite ends passing through a cross bar G on the handle H of the tool. I are springs sleeved upon the rods F, one end abutting against the cross bar G and the other against the collar J on the rod, whereby a resilient tension is exerted upon the rod to press the member C against the work.

With the construction as described, in use, the cover being first placed upon the can, the tool is registered therewith and pressed toward the cover, which will first cause the member C to centrally engage the cover and to hold it firmly in place. A further pressure will flex the springs I and move the tool B against the edge of the cover, whereupon solder which is melted by the tool will form a sweat joint between the cover and can. As soon as the soldering is complete, the pressure on the tool is lessened, which permits the tool B to withdraw from contact with the cover, while the latter is still held in position by the pressure of the member C. This breaks the adhesion between the molten solder on the tool and the cover, so that the tool may then be removed without displacement of the cover.

What we claim as our invention is:

1. The combination with a soldering tool having an annular edge portion for engaging the work, a transversely extending slot, and a central recess within said annular portion connecting with said slot, of a member in said central recess, a cross member connected therewith passing outward through said slot, a pair of rods engaging said cross member and extending longitudinally of the tool, and means for resiliently pressing upon said rods to hold said central member against the work during the withdrawal of the tool.

2. The combination with a soldering tool having a projection at one end for engaging the work, a transversely extending slot, and a recess adjacent to said projection connecting with said slot, of a member in said recess, a cross member connected therewith and extending through said slot, and means for resiliently pressing upon said cross member to hold said member in the recess against the work during the withdrawal of the tool.

3. The combination with a soldering tool having an annular portion for engaging the work, a transversely extending slot, and a central recess within said annular portion connecting with said slot, of a member in said recess, a cross member connected therewith and extending through said slot, a rod engaging said cross member and extending longitudinally of the tool, and means for resiliently pressing upon said rod to hold said member in the recess against the work during the withdrawal of the tool.

In testimony whereof we affix our signatures.

FRANK KUHN.
LAWRENCE H. THOMAS.
JULES G. SPIESS.